(12) United States Patent
Hansen et al.

(10) Patent No.: US 6,553,615 B1
(45) Date of Patent: Apr. 29, 2003

(54) TWO-PIECE SLIDING GROMMET

(75) Inventors: Wayne M. Hansen, Chippewa Falls, WI (US); James S. Tisol, Jr., Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 137 days.

(21) Appl. No.: 09/666,782

(22) Filed: Sep. 21, 2000

(51) Int. Cl.$^7$ ................................................. H02G 3/22
(52) U.S. Cl. ........................... 16/2.1; 16/2.2; 174/65 G; 174/152 G
(58) Field of Search .................... 16/2.1, 2.2; 174/65 E, 174/152 G, 152 R

(56) References Cited

U.S. PATENT DOCUMENTS

| | | | |
|---|---|---|---|
| 2,228,176 A | * | 1/1941 | Miller |
| 4,002,821 A | * | 1/1977 | Satoh et al. |
| 4,043,579 A | | 8/1977 | Meyer |
| 4,407,042 A | * | 10/1983 | Schramme et al. |
| 4,458,552 A | * | 7/1984 | Spease et al. |
| 4,626,620 A | * | 12/1986 | Plyler |
| 4,729,606 A | | 3/1988 | Narita et al. |
| 4,768,907 A | | 9/1988 | Gauron |
| 4,865,505 A | | 9/1989 | Okada |
| 4,971,500 A | | 11/1990 | Benoit et al. |
| 5,129,768 A | | 7/1992 | Hoyle et al. |
| 5,429,467 A | | 7/1995 | Gugle et al. |
| 5,484,175 A | | 1/1996 | Teich et al. |
| 5,533,237 A | | 7/1996 | Higgins |
| 5,536,125 A | | 7/1996 | Gaw, Jr. |
| 5,738,476 A | | 4/1998 | Assimakopoulos |
| 5,806,139 A | * | 9/1998 | Anderson et al. |

FOREIGN PATENT DOCUMENTS

| | | |
|---|---|---|
| EP | 0 698 741 A1 | 6/1995 |
| EP | 0 719 952 A1 | 11/1995 |
| FR | 2 554 522 | 10/1985 |
| FR | 2 740 183 | 4/1997 |

* cited by examiner

Primary Examiner—Gary Estremsky
Assistant Examiner—Mark Williams
(74) Attorney, Agent, or Firm—Mark W. Croll; Paul F. Donovan

(57) ABSTRACT

The grommet includes a base and a slider. The base includes a rectangular slot which receives an extended screw boss of the slider. The extended screw boss can slide linearly within the rectangular slot with a single degree of freedom. The base includes guide tracks and inwardly extending protrusions between which lateral guide tracks of the slider are slidably engaged.

20 Claims, 5 Drawing Sheets

TWO-PIECE SLIDING GROMMET

BACKGROUND OF THE INVENTION

1. Field of the Invention

This invention pertains to a two-piece grommet which is used to attach panels to one another. In particular, the grommet allows travel in one plane to compensate for thermal expansion and contraction between the panels.

2. Description of the Prior Art

In the prior art, it is known to use grommets to attach a first panel to a second panel. While sliding grommets are likewise known in the prior art to allow for sliding between the panels, these prior art grommets have been deficient in that the strip torque has been variable as the metal stamping process used to manufacture these grommets has typically not had good thread engagement characteristics. Similarly, these prior art sliding grommets have sometimes been deficient with respect to their resistance to rotation. Furthermore, these prior art sliding grommets typically have not provided good sealing characteristics with respect to water, dust and sound.

Some examples of prior art include U.S. Pat. No. 5,738,476 entitled "Fastener" issued on Apr. 14, 1998 to Assimakopoulos;

U.S. Pat. No. 5,536,125 entitled "Sliding Two-Piece Fastener" issued on Jul. 16, 1996 to Gaw, Jr.; U.S. Pat. No. 5,533,237 entitled "Grommet Fastener Assembly for Automobiles" issued on Jul. 9, 1996 to Higgins; U.S. Pat. No. 5,484,175 entitled "Cabinet Lock and Method for Using Same" issued on Jan. 16, 1996 to Teich et al.; U.S. Pat. No. 5,429,467 entitled "High Torque Screw and Grommet Fastener Assembly" issued on Jul. 4, 1995 to Gugle et al.; U.S. Pat. No. 5,129,768 entitled "Sliding Grommet" issued on Jul. 14, 1992 to Hoyle et al.; U.S. Pat. No. 4,971,500 entitled "Enclosed Plastic Screw Grommet" issued on Nov. 20, 1990 to Benoit et al.; U.S. Pat. No. 4,865,505 entitled "Structure for Mounting Automobile Interior Upholstering Material" issued on Sep. 12, 1989 to Okada; U.S. Pat. No. 4,729,606 entitled "Apparatus for Mounting a Wheel Cap" issued on Mar. 8, 1988 to Narita et al.; and U.S. Pat. No. 4,043,579 entitled "Elastomeric Bumper Securing Press Fit Clip" issued on Aug. 23, 1977 to Meyer.

OBJECTS AND SUMMARY OF THE INVENTION

It is therefore an object of the present invention to provide a sliding grommet for attaching two panels wherein the grommet has increased resistance to rotation.

It is therefore a further object of the present invention to provide a sliding grommet for attaching to panels wherein the grommet has a relatively uniform strip torque.

It is therefore a still further object of the present invention to provide a sliding grommet for attaching two panels wherein the grommet provides increased sealing capabilities with respect to moisture, dust and sound.

It is therefore a final object of the present invention to provide a sliding grommet which achieves the above objects with a relatively low manufacturing cost.

These and other objects are attained by providing a two-piece grommet comprising a base which detent engages a rectangular aperture on a first panel. The two-piece grommet further includes a slider which includes an extended screw boss with a square cross section which is slidably engaged within a rectangular slot formed in the base. A second panel is engaged to the sliding grommet by a screw which extends through the second panel and is engaged within the extended screw boss.

The screw boss extends into the rectangular slot in the base and is slidably engaged therein. This reduces rotation between the slider and the base. Similarly, extending the screw boss into the body increases the strength of the screw boss, increases the strip torque and reduces the variability of the strip torque.

The resulting fit between the base and the slider, with reduced or eliminated exposed apertures, increases the sealing with respect to moisture, dust and sound. This sealing can be further improved by providing a foam or rubber washer between the base and the first panel.

Moreover, the resulting design is relatively inexpensive to manufacture.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
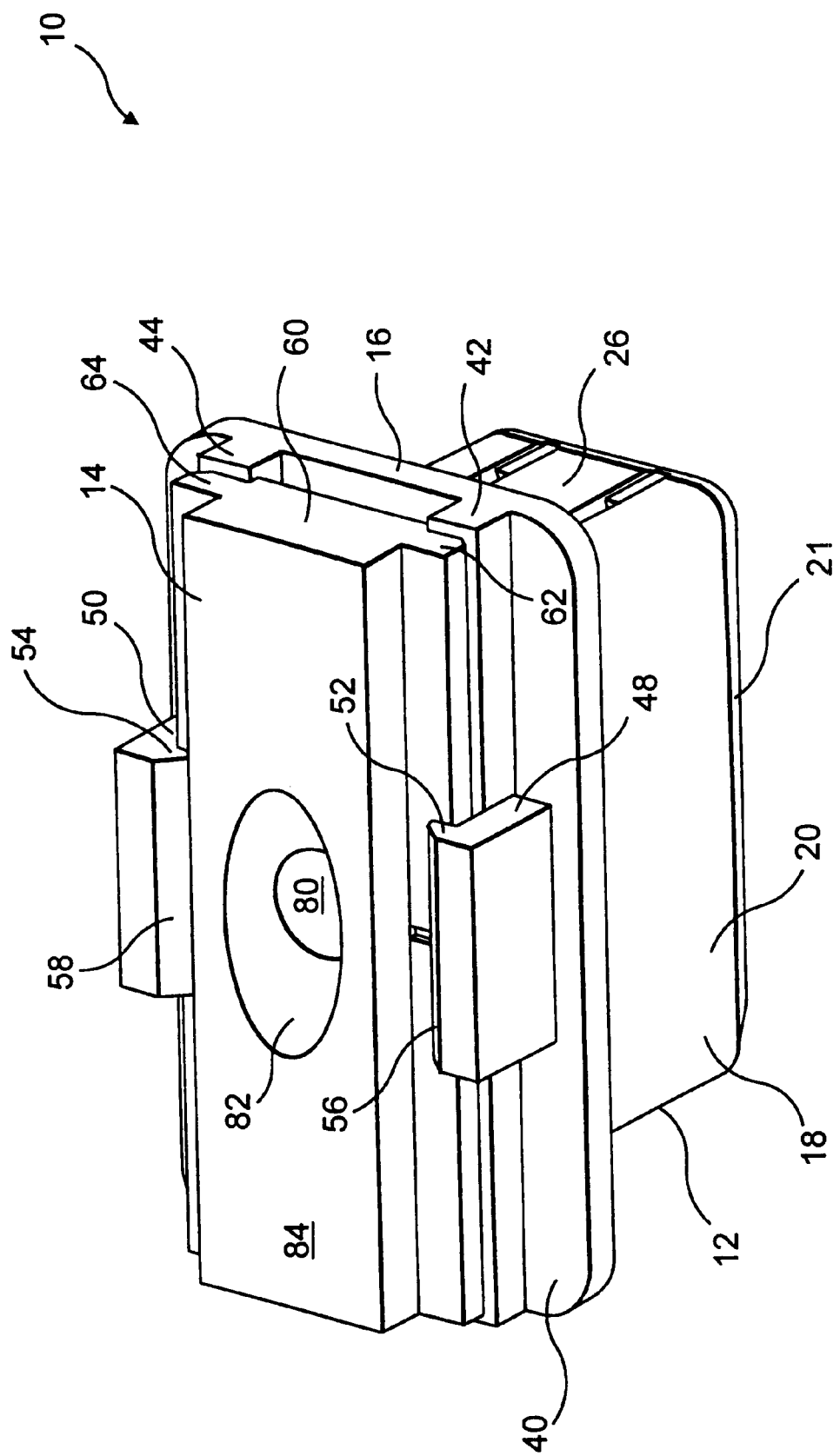
FIG. 1 is a top perspective view of the sliding grommet of the present invention.

Referring now to the drawings in detail, wherein like numerals refer to like elements throughout the several views, one sees that FIG. 1 is a perspective view of grommet 10. Grommet 10 includes relatively fixed base 12 which is typically made from acetel. Grommet 10 further includes slider 14 which slides with respect to base 12 and is typically made from nylon 6/6. Those skilled in the art will recognize that other equivalent materials may be used.

Figure 6:
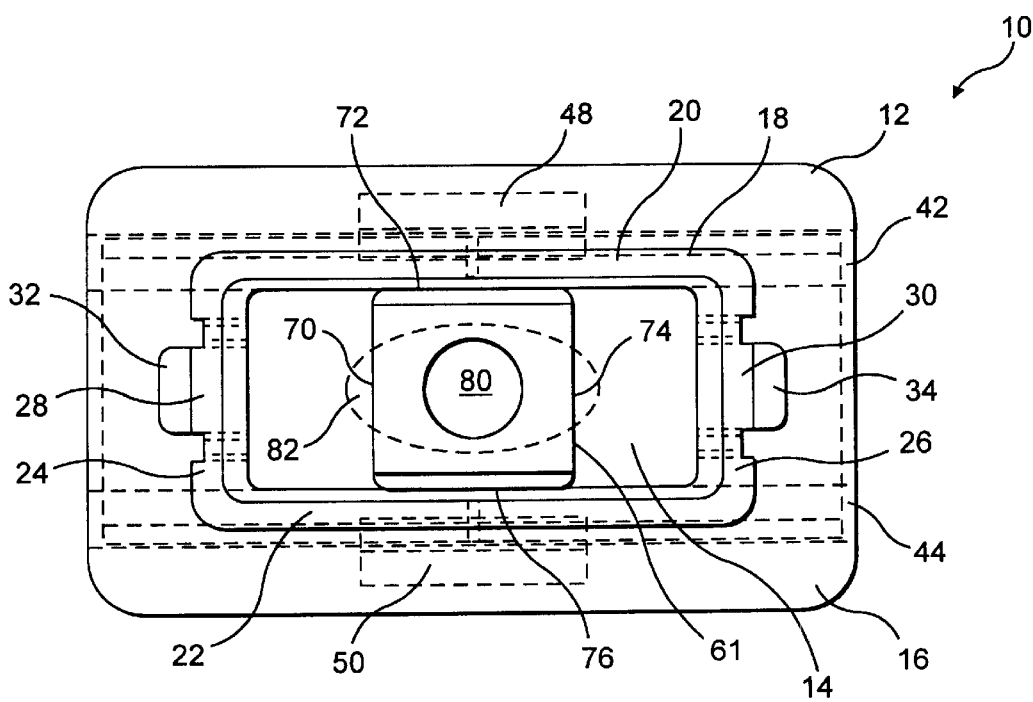
FIG. 6 is a bottom view, partially in phantom, of the sliding grommet of the present invention.

Base 12 includes head 16 which is generally planar and forms the upper surface of base 12 in the orientation of the various figures. Base 12 further includes rectangular shank 18 which extends downwardly from base 12. As shown in FIG. 6, shank 18 includes two longer walls 20, 22 which are parallel to each other. Shank 18 further includes two shorter walls 24, 26 which are parallel to each other and perpendicular to longer walls 20, 22.

Figure 5:
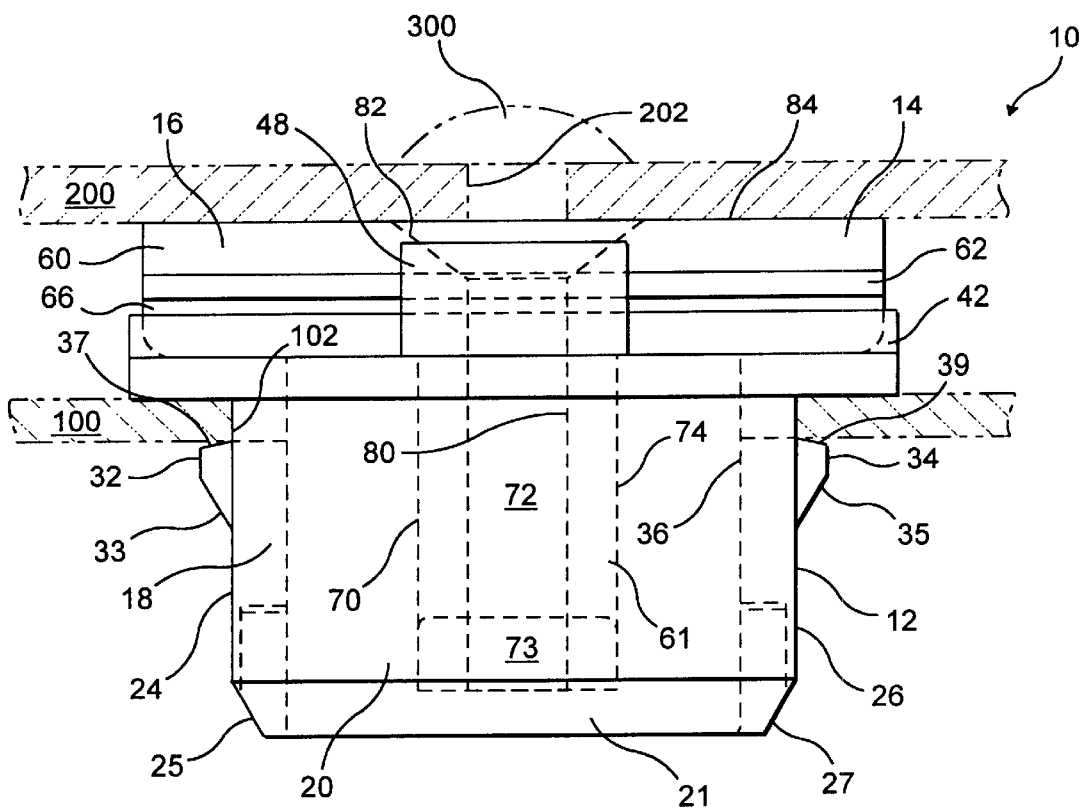
FIG. 5 is a side view, partially in phantom, of the sliding grommet of the present invention, with the first and second panels shown in phantom.

Upwardly extending detent tabs 28, 30 with outwardly extending detent fingers 32, 34 are formed from portions of shorter walls 24, 26, respectively. Lower ramped surfaces 33, 35 are formed on outwardly extending detent fingers 32, 34, respectively, to allow outwardly extending detent fingers 32, 34 to be urged inwardly as shank 18 is inserted into rectangular aperture 102 of first panel 100 (see FIG. 5). Upper surfaces 37, 39 of outwardly extending detent fingers 32, 34 are virtually parallel with first panel 100 so as to detent engage first panel 100 in the position shown in FIG. 5.

Figure 4:
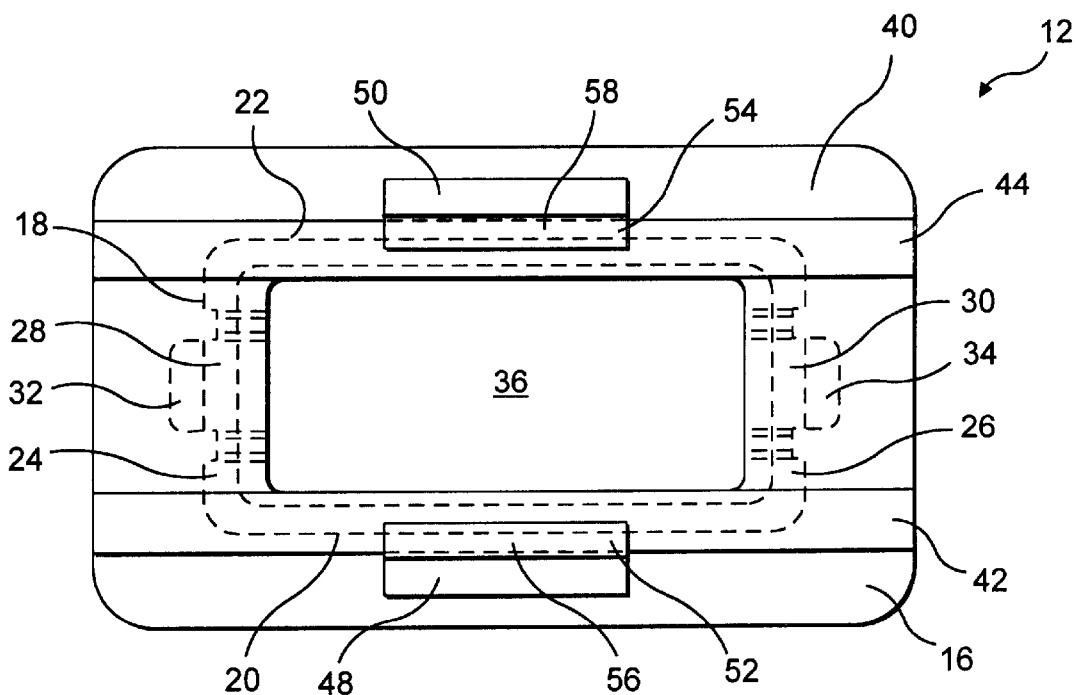
FIG. 4 is a top view, partially in phantom, of the sliding grommet of the present invention.

As shown in FIG. 4, rectangular slot 36 extends through head 16 and longitudinally through shank 18 and is bounded by walls 20, 22, 24, 26. Walls 20, 22, 24, 26 include lower chamfered edges 21, 23, 25, 27, respectively.

Figure 7:
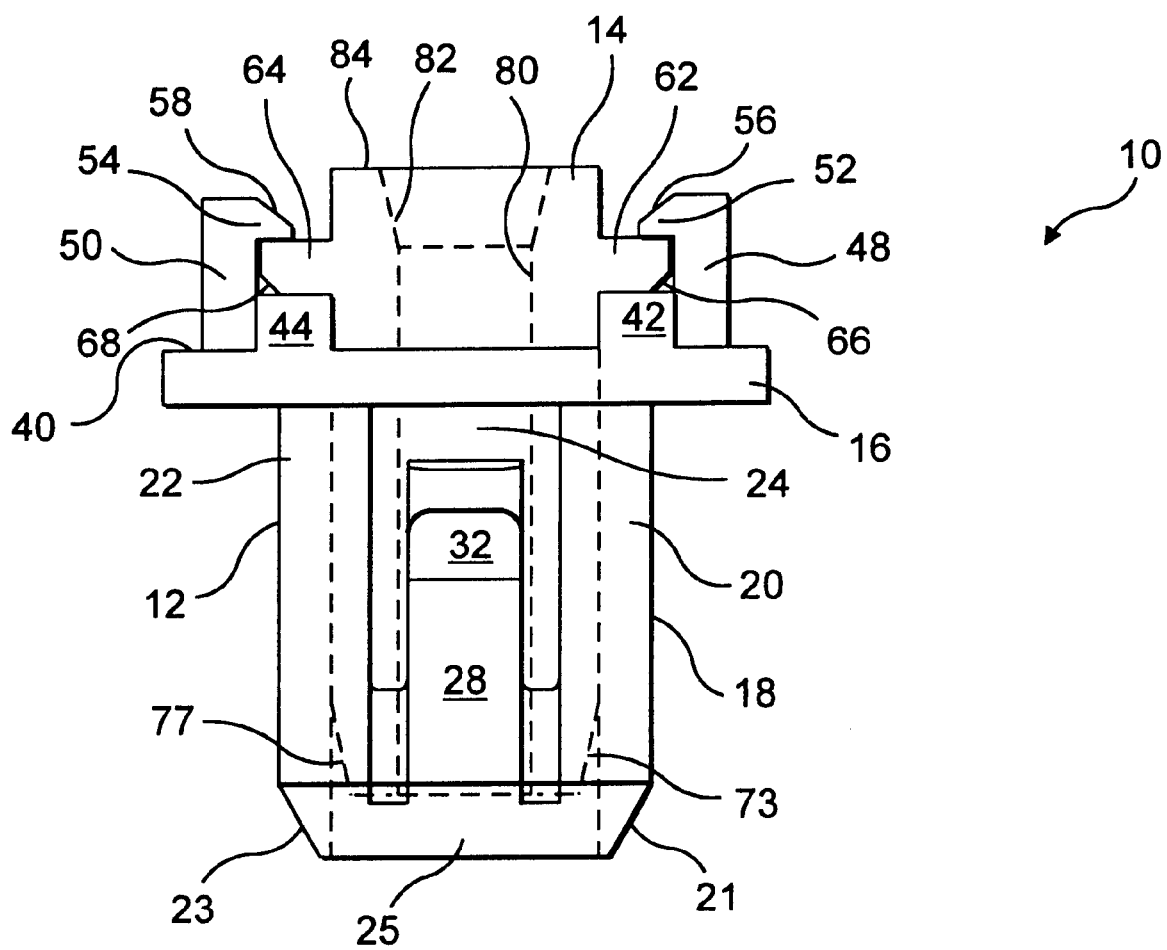
FIG. 7 is an end view, partially in phantom, of the sliding grommet of the present invention.

As shown on FIGS. 1, 4 and 7, upper surface 40 of head 16 includes guide rails 42, 44 which pass immediately adjacent to rectangular slot 36. Furthermore, stems 48, 50 rise from upper surface 40 of head 16 outwardly adjacent from central portions of guide rails 42, 44. Protrusions 52, 54 extend inwardly from the upper portions of stems 48, 50. Protrusions 52, 54 include upper ramped surfaces 56, 58 which, as will be explained in detail hereinafter, allow stems 48, 50 to be urged apart during the initial assembly of slider 14 into base 12.

Figure 2:
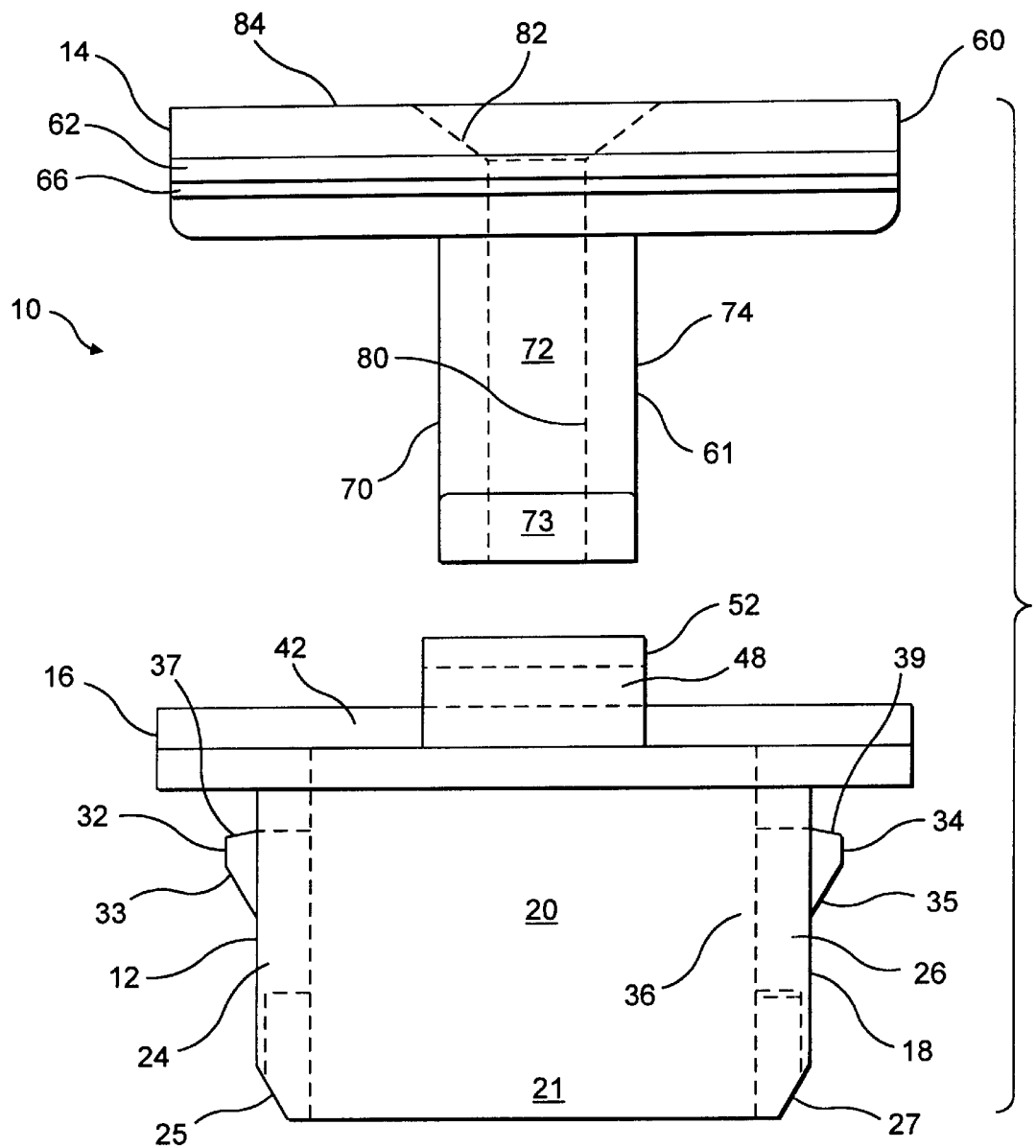
FIG. 2 is an exploded side plan view of the sliding grommet of the present invention.
Figure 3:
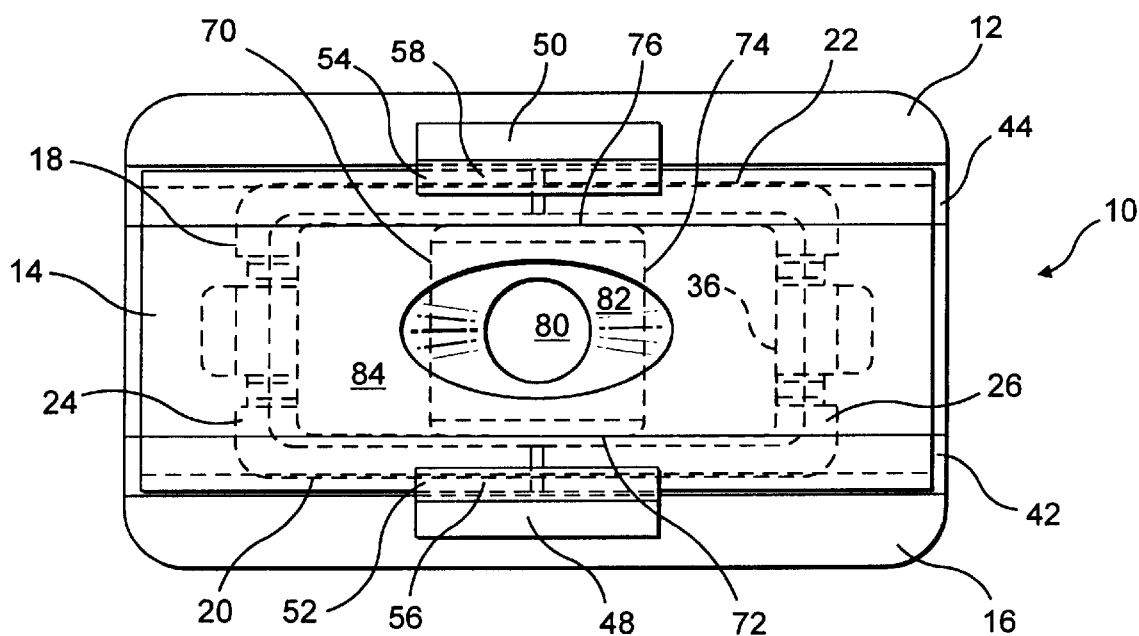
FIG. 3 is a top plan view of the base of the sliding grommet of the present invention.

Slider 14 includes upper sliding portion 60 which is generally planar and extended screw boss 61 which has a cross section which is square. As shown in FIGS. 1 and 7, upper sliding portion 60 includes laterally extending guide wings 62, 64 which, in the installed position, are slidably engaged between rails 42, 44 and inwardly extending protrusions 52, 54, respectively. Laterally extending guide wings 62, 64 have lower chamfered surfaces 66, 68, respectively, which ramp against upper ramped surfaces 56, 58 thereby urging stems 48, 50 apart as slider 14 is initially assembled with base 12. After laterally extending guide wings 62, 64 clear inwardly extending protrusions 52, 54, stems 48, 50 snap back into position. In other words, during this initial assembly, slider 14 is pushed downwardly into base 12 from the orientation shown in FIG. 2 (unassembled) to the orientation shown in FIG. 1 (assembled).

Extended screw boss 61 of slider 14 has a square cross section formed by walls 70, 72, 74, 76 which have a width equal to the width of rectangular slot 36 (that is, the interior spacing between longer walls 20, 22 of shank 18). In the installed position, extended screw boss 61 travels linearly within rectangular slot 36. Extended screw boss 61 could be rectangular, but the distance between walls 72, 76 would be equal to the width of rectangular slot 36 while the distance between walls 70, 74 would be less than the length of rectangular slot 36 by an amount equal to the desired linear travel of slider 14 with respect to base 12.

Wall 72 of extended screw boss 61, which slides against the interior of longer wall 20 of shank 18, has chamfered lower end 73. Likewise, wall 76 of extended screw boss 61, which slides against the interior of longer wall 22 of shank 18, has chamfered lower end 77 to aid in the initial insertion of slider 14 into base 12.

Screw aperture 80 extends through upper sliding portion 60 and extended screw boss 61 of slider 14. Screw aperture 80 includes oval countersunk portion 82 formed on the upper surface 84 of upper sliding portion 60.

In order to assemble grommet 10, extended screw boss 61 of slider 14 is inserted into rectangular slot 36 of base 12. Slider 14 is then urged toward base 12 so lower chamfered surfaces 66, 68 of laterally extending guide wings 62, 64 ramp against upper ramped surfaces 56, 58 thereby urging stems 48, 50 apart until guide wings 62, 64 clear inwardly extending protrusions 52, 54 and stems 48, 50 snap back into position.

In order to install the assembled grommet 10, the user typically first inserts shank 18 into rectangular aperture 102 (which has the same shape as the cross section of shank 18) in first panel 100 (see FIG. 5) until first panel 100 clears outwardly extending detent fingers 32, 34 of upwardly extending detent tabs 28, 30 so that first panel 100 is engaged between head 16 of base 12 and outwardly extending detent fingers 32, 34. A foam washer, rubber gasket or similar device (not shown) can be installed between first panel 100 and head 16 in order to increase the sealing function. Screw 300 (see FIG. 5) is then inserted through aperture 202 of second panel 200 and into screw aperture 80. Screw 300 is then rotatably driven in a standard way such that the threads of screw 300 cut into the walls of screw aperture 80 and the head of screw 300 is driven against second panel 200. The limited range of sliding linear motion between slider 14 and base 12 then becomes the limited range of sliding linear motion (with a single degree of freedom) between first panel 100 and second panel 200.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A grommet including:
   a base including a head and a shank, with a slot extending through said head and said shank;
   a slider including a boss inserted through said slot of said base, wherein said slider can transversely slide within said slot relative to the axis of said shank of said base, and wherein an aperture is formed within said boss; and
   first engagement elements formed on said base which slidably engage second engagement elements formed on said slider such that said slider transversely slides within said slot relative to the axis of said shank of said base, wherein one of said first engagement elements and said second engagement elements includes stems with inwardly extending protrusions and the other of said first engagement elements and said second engagement elements includes lateral wings which are engaged by said stems.

2. The grommet of claim 1 wherein said slider slides linearly within said base with only a single degree of freedom.

3. The grommet of claim 2 wherein said first engagement elements include stems with inwardly extending protrusions and said second engagement elements include lateral wings which are engaged by said stems.

4. The grommet of claim 3 wherein said stems are formed on said head of said base.

5. The grommet of claim 4 wherein guide rails are formed on said head adjacent to said slot, wherein said lateral wings are slidably engaged between said inwardly extending protrusions and said guide rails.

6. The grommet of claim 5 further including detent fingers formed on an exterior of said shank for engaging a first panel between said detent fingers and said head.

7. The grommet of claim 6 wherein said aperture of said boss is configured to receive a screw which passes through a second panel.

8. The grommet of claim 7 wherein said slot is rectangular with a width substantially equal to a width of said boss.

9. The grommet of claim 8 wherein said inwardly extending protrusions and said lateral wings include complementary ramped surfaces to urge said stems apart during initial assembly of said slider to said base.

10. The grommet of claim 9 wherein said aperture is countersunk.

11. The grommet of claim 10 wherein said base is formed from acetel and said slider is formed from nylon.

12. A grommet for attaching two panels to one another, said grommet comprising:

a base including a head and a shank, with a slot extending through said head and said shank, and with said shank being orthogonal to said head, said base being adapted for engagement with a first panel;

a slider including a sliding portion and a boss inserted through said slot of said base, wherein an aperture is formed within said boss, and wherein said boss is orthogonal to said sliding portion such that said boss is adjustably positioned within said slot when said sliding portion is moved linearly along said head, said boss being adapted to receive a fastener so as to allow a second panel to be attached to said slider, the second panel being adjustably positioned with respect to the first panel in accordance with the adjustable positioning of said boss with in said slot; and first engagement elements formed on said base which slidably engage second engagement elements formed on said slider such that said slider slides perpendicular to said shank of said base.

13. The grommet of claim 12, wherein said slider slides linearly within said base with only a single degree of freedom.

14. The grommet of claim 12, wherein said aperture extends through said sliding portion and said boss.

15. The grommet of claim 12, wherein said first engagement elements include stems formed on said head with inwardly extending protrusions and said second engagement elements include lateral wings formed on said sliding portion which are engaged by said stems.

16. The grommet of claim 15, wherein guide rails are formed on said head adjacent to said slot, wherein said lateral wings are slidably engaged between said inwardly extending protrusions and said guide rails.

17. The grommet of claim 16, further including detent fingers formed on an exterior of said shank for engaging a first panel between said detent fingers and said head.

18. The grommet of claim 17, wherein said aperture of said boss is configured to receive a screw which passes through a second panel.

19. The grommet of claim 18, wherein said slot is rectangular with a width substantially equal to a width of said boss.

20. The grommet of claim 19, wherein said sliding portion of said slider has an upper planar surface orthogonal to said boss for supporting said second panel in a parallel relationship to said first panel.

* * * * *